Dec. 13, 1966 P. K. GALLAGHER ETAL 3,292,062
METHOD FOR PREPARING STABILIZED BARIUM TITANATE, AND CAPACITOR
Filed June 1, 1964 2 Sheets-Sheet 1

INVENTORS P. K. GALLAGHER
J. B. MAC CHESNEY
BY
ATTORNEY

3,292,062
METHOD FOR PREPARING STABILIZED BARIUM TITANATE, AND CAPACITOR

Patrick K. Gallagher, Basking Ridge, and John B. MacChesney, Morris Plains, N.J., assignors to Bell Telephone Laboratories, Incorporated, New York, N.Y., a corporation of New York
Filed June 1, 1964, Ser. No. 371,628
5 Claims. (Cl. 317—258)

This application is a continuation-in-part of our application, Serial No. 194,561, filed May 14, 1962, now abandoned.

This invention relates to a technique for the preparation of stabilized barium titanate ceramics which are of particular interest for use as dielectric materials. More particularly, the present invention relates to a technique for the preparation of barium titanates containing lanthanum oxide.

In recent years, considerable interest has been generated in barium titanate because of its unusually high dielectric constant, so suggesting its use as a capacitor material. Unfortunately, the very same material evidences certain undesirable characteristics which have created impediments to its total exploitation for such purposes. The most noteworthy of these difficulties resides in electrical breakdown and a concomitant decrease in insulation resistance under high D.-C. voltage stresses starting at temperatures in excess of the ferroelectric to paraelectric transition (Curie) point (120° C.), and an inordinately high temperature coefficient of capacitance in the vicinity of the Curie point.

The early workers in the titanate art suggested that such difficulties could be substantially eliminated by the substitution of minor quantities of niobium or tantalum for equivalent amounts of titanium. Compositions so prepared did, in fact, evidence an improvement in average lifetime when subjected to voltages in excess of 30 volts/mil at temperatures appreciably beyond 250° C.

More recently, it was proposed to add lanthanum oxide to barium titanate in amounts ranging from 0.016 to 0.256 mol percent, the additions at the lower end of the range resulting in a material evidencing moderate temperature stability and satisfactory resistivities. However, it was noted that compositions containing greater than 0.128 mol percent lanthanum oxide were semiconducting rather than insulating.

In accordance with this invention, a technique is described for the preparation of barium titanate ceramics containing lanthanum oxide additions in amounts within the range of 0.3 to 1 mol percent based on barium titanate, the compositions so prepared being insulating in nature and evidencing an increase of several orders of magnitude in lifetime as compared with the prior art materials. It has also been determined that the compositions of interest evidence enhanced dielectric properties in that they have a decreased peak in permittivity ot the Curie point.

The inventive technique involves preparing a composition, which may be represented as $$BaTiO_3 \cdot xLa_2O_3$$

wherein $x$ has a value within the range of 0.003 to 0.01, by mixing a well defined barium titanate having a purity of at least 98.00 percent, exclusive of ions normally added to barium titanate to alter its Curie temperature, with a lanthanum compound in an amount sufficient to provide from 0.3 to 1 mol percent $La_2O_3$ and firing the resultant mixture in air at temperatures within the range of 1400–1550° C. Compositions prepared in the described manner are insulating in nature and evidence a resistivity greater than $10^7$ ohms-cm. at 250° C. and voltages of 50 volts/mil.

The invention will be more readily understood from the following detailed description taken in conjunction with the accompanying drawing wherein.

Figure 3:
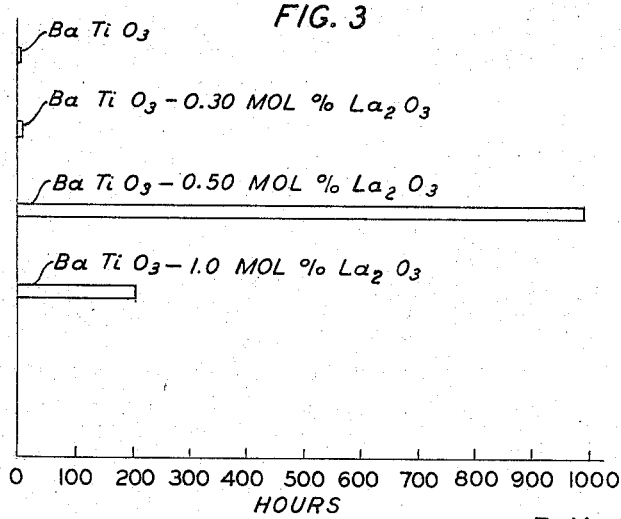
Figure 4:
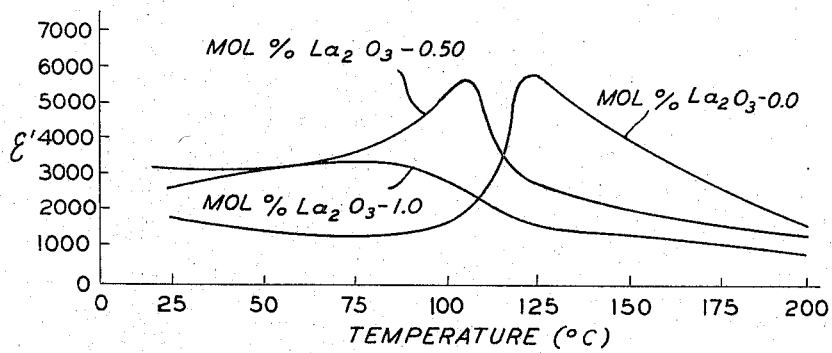

FIG. 3 is a graphical representation in bar form showing a comparison of average lifetime of barium titanate samples containing varying amounts of lanthanum oxide when tested at 50 volts/mil at 200° C.; and FIG. 4 is a graphical representation on coordinates of dielectric constant against temperature in degrees centigrade showing the temperature dependence of the dielectric constant for barium titanate samples containing varying amounts of lanthanum oxide.

A general outline of the procedure employed in preparing the compositions described herein together with satisfactory ranges of operating parameters will now be given.

The inventive technique relies upon the selection of a well defined barium titanate starting material having a purity of at least 98.00 percent, exclusive of ions normally added to such materials to alter the Curie temperature, for example, strontium, calcium, magnesium and lead, and a mixing procedure capable of producing a homogeneous body not evidencing the discoloration normally associated with semiconductive bodies. Thus, it is intended to utilize a barium titanate material wherein the combined content of common impurities such as silicon, copper, iron, zirconium, nickel, aluminum, manganese, et cetera, is less than 2 percent, such material comprising the barium titanate source in the following description and examples.

The lanthanum is introduced into the titanate in the form of a soluble salt or solution, for example, chloride, nitrate or bromide, which is subsequently converted to the corresponding hydroxide which precipitates and is converted to the oxide upon firing.

The barium titanate starting material is initially mixed with approximately ten times its weight of water, thereby forming a thin slurry. Following, a reagent grade lanthanum compound, for example, lanthanum chloride, is slowly added to the slurry in an amount sufficient to provide 0.3 to 1 mol percent of lanthanum oxide in the final composition, a preferred composition containing 0.5 mol percent lanthanum oxide.

The next step in the inventive technique involves adding ammonium hydroxide into the mixture until a pH value of at least 9 is attained, such value being indicated by any suitable means, for example, pH meter, et cetera. It is during this step that the lanthanum oxide precipitates. During the precipitation step, the mixture is vigorously stirred by magnetic means.

The resultant composition together with the remaining solution is filtered, washed with distilled water and finally air dried. The dried composition is then pressed in any commercially available die at a pressure of approximately two tons per square inch and finally fired in air for a time period within the range of 0.25 to 4 hours at a temperature within the range of 1400–1550° C., such temperatures being required to obtain a well sintered dense body, and slowly cooling to room temperature. It has been determined that compositions so prepared surprisingly evidence a resistivity greater than $10^7$ ohm/cm at room temperatures and were stable at temperatures of 250° C. when subjected to D.-C. voltage stresses of 50 volts/mil.

Figure 1:
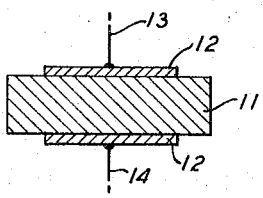
FIG. 1 is a cross-sectional view of a capacitor utilizing compositions of this invention.

With further reference now to FIG. 1, there is shown in cross-sectional view a capacitor fabricated from the compositions grown in accordance with the technique described above.

A barium titanate composition 11, prepared as discussed, is ground to a thickness of approximately 0.040 inch and a commercially available gold paste 12 is painted on the center portion of the resultant disks leaving an approximately 0.1 inch unpainted ring around the edge of the barium titanates, thereby providing the electrodes with a sufficient air gap to preclude arcing at high applied voltages. The resultant assembly is then fired at 700° C. to mature the paste. The capacitor assembly is completed by attaching copper leads 13 and 14 to the layer of gold paste 12.

Figure 2:
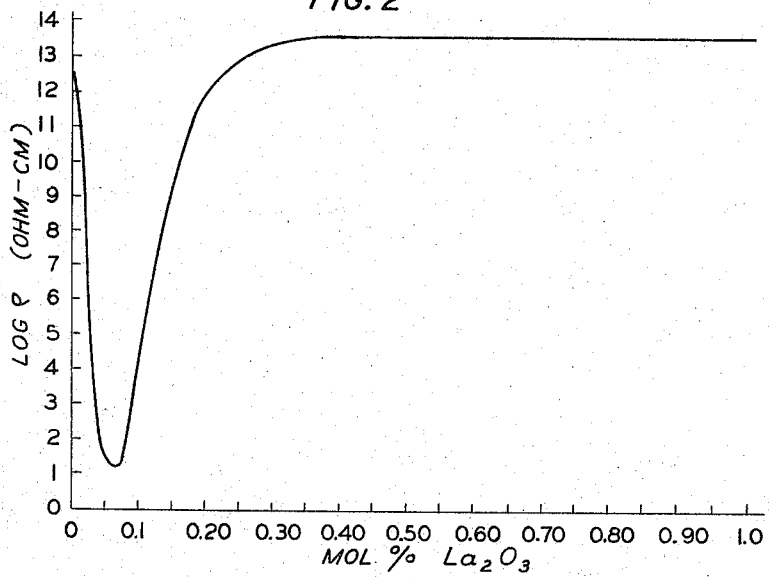
FIG. 2 is a graphical representation on coordinates of resistivity in ohm-cm. against $La_2O_3$ content in mol percent based on barium titanate showing the transition from semiconducting to insulating of bodies prepared in the described manner.

With further reference now to FIG. 2, there is shown a graphical representation of resistivities of lanthanum doped $BaTiO_3$ on semi-log paper on coordinates of the log of the resistivity in ohm-cm against $La_2O_3$ composition in mol percent for compositions prepared as described. It will be noted that the desired level of resistivity, at least $10^7$ ohm-cm, which is indicative of insulating properties is attained well below the noted minimum of 0.3 mol percent $La_2O_3$. However, at elevated temperatures and high voltage stresses the resistivity is suppressed and to compensate for the increased voltage and temperature effect the lower limit is set at 0.3 mol percent.

In order that those skilled in the art may more fully understand the inventive concept herein presented, the following examples are given by way of illustration and not limitation.

*Example I*

A commercially available barium titanate having the following purity was employed as the starting material.

| | Impurity (wt. percent) | | |
|---|---|---|---|
| $BaTiO_3$ | <0.03 Mg, Sr | <0.005 Ca, Si, Zn. | <0.001 Al, Cu, Fe, Ni, Pt. |

23.3 grams of the barium titanate having a particle size of the order of 1 micron were slowly mixed with 200 milliliters of water while stirring with a magnetic stirring means, so forming a thin slurry. To the slurry there was added 50 milliliters of a stock solution of $LaCl_3 \cdot 7H_2O$ (3.714 grams/liter). Next ammonium hydroxide was slowly pipetted into the mixture while vigorously stirring with magnetic means until a pH value of 9 was attained, such value being indicated by a pH meter. The resultant composition was filtered in a Büchner funnel, washed with distilled water and air dried. The dried composition was then pressed in a die at a pressure of two tons per square inch. Finally, the pressed composition was fired in air for 1 hour at 1500° C.

The composition of the article whose preparation is described above corresponds to the formula:

$$BaTiO_3 \cdot 0.005 La_2O_3$$

and evidenced a room temperature resistivity of $2 \times 10^{13}$ ohm-cm.

*Example II*

The procedure of Example I was repeated with the exception that 30 milliliters of stock solution of $LaCl_3 \cdot 7H_2O$ were employed. The resultant composition had the following formula:

$$BaTiO_3 \cdot 0.003 La_2O_3$$

and evidenced a room temperature resistivity of $1 \times 10^{12}$ ohm-cm.

*Example III*

The procedure of Example I was repeated with the exception that 100 milliliters of stock solution of $$LaCl_3 \cdot 7H_2O$$

were employed, and firing was conducted at 1550° C. so resulting in the following composition which evidenced a room temperature resistivity of $3 \times 10^{13}$ ohm-cm:

$$BaTiO_3 \cdot 0.01 La_2O_3$$

In order to determine the characteristics of the compositions so produced, capacitors were prepared as discussed above. The samples were placed in a suitable receptacle accommodating ten samples, such receptacle having spring loaded brass contacts with Teflon insulation. The samples were then elevated to a temperature of 200° C. and a D.-C. voltage of 50 volts/mil applied until degradation occurred. Degradation was indicated by dielectric breakdown of a body which was noted by the passage of 0.025 ampere through the sample, this current tripping a circuit breaker and disconnecting the counter-timer circuit of the life test set.

A summary of the results obtained with various compositions may be seen in FIG. 3 in the form of a bar graph. The marked improvement in lifetimes of samples containing 0.3, 0.5 and 1 mol percent of $La_2O_3$ relative to barium titanate is clearly evident.

Measurement of dielectric constant at 100 kilocycles were performed as a function of temperature for compositions containing 0, 0.50 and 1.00 mol percent $La_2O_3$, the results being shown in FIG. 4. It can be observed from the graph of FIG. 4 that continued addition of $La_2O_3$ causes a decrease in both the dielectric constant and the Curie temperature with the desired effect of no marked peak in dielectric constant for the composition containing 1 mol percent $La_2O_3$.

While the invention has been described in detail in the foregoing specification and the drawing similarly illustrates the same, the aforesaid is by way of illustration only and is not restrictive in character. The several modifications which will readily suggest themselves to persons skilled in the art are all considered within the scope of this invention, reference being had to the appended claims.

What is claimed is:

1. A method for the preparation of a composition having the general formula $BaTiO_3 \cdot xLa_2O_3$ wherein $x$ has a value within the range of 0.003 to 0.01 which comprises the steps of mixing barium titanate having a purity of at least 98.00 percent, exclusive of strontium, calcium, magnesium and lead ions, with a lanthanum compound in an amount sufficient to provide 0.3 to 1 mol percent $La_2O_3$ in the desired composition and firing the resultant mixture in air at a temperature within the range of 1400–1550° C. for a time period within the range of 0.25 to 4 hours, whereby there is produced an insulating composition evidencing a room temperature resistivity of at least $10^7$ ohm-cm.

2. A method in accordance with the procedure of claim 1 wherein said composition is $BaTiO_3 \cdot 0.003\ La_2O_3$.

3. A method in accordance with the procedure of claim 1 wherein said composition is $BaTiO_3 \cdot 0.005\ La_2O_3$.

4. A method in accordance with the procedure of claim 1 wherein said composition is $BaTiO_3 \cdot 0.01\ La_2O_3$.

5. A capacitor comprising an element having the general formula $BaTiO_3 \cdot xLa_2O_3$ wherein $x$ has a value within the range of 0.003 to 0.01, and at least two spaced electrodes contacting said element, said element having been prepared in accordance with the procedure of claim 1.

References Cited by the Examiner

UNITED STATES PATENTS 2,985,700    5/1961    Johnston _____ 106—39

FOREIGN PATENTS 714,965    9/1954    Great Britain.

TOBIAS E. LEVOW, *Primary Examiner.*

HELEN McCARTHY, *Assistant Examiner.*